Feb. 17, 1959 D. H. ESLER 2,874,020

MEANS OF RECORDING ELAPSED TIME

Filed May 6, 1954 2 Sheets-Sheet 1

INVENTOR.
DAVID H. ESLER

BY [signature]

ATTORNEYS

Feb. 17, 1959 D. H. ESLER 2,874,020
MEANS OF RECORDING ELAPSED TIME
Filed May 6, 1954 2 Sheets-Sheet 2

INVENTOR.
DAVID H. ESLER
BY Price & Heneveld
ATTORNEYS 2,874,020

MEANS OF RECORDING ELAPSED TIME

David H. Esler, Grand Rapids, Mich.

Application May 6, 1954, Serial No. 428,096
5 Claims. (Cl. 346—85)

This invention relates to time recorders and more particularly to a time recorder adapted to indicate elapsed time on a card inserted into said recorder.

Devices for recording time have been known for many years, many of them employing various means of recording the time in such sequences that computing the elapsed time is facilitated. Although these devices may have produced satisfactory results in the particular applications for which they were designed, they are all unsatisfactory for recording elapsed time without considerable forethought on the part of the operator of said recorders as well as mental calculations by the individual reading the records obtained from said recorders.

Since the introduction of devices for recording time in the form of printed records on suitable cards inserted into them, there has been an ever increasing demand for a recorder which will indicate elapsed time as well as printing starting time and finishing time on the aforementioned card, it being desirous to accomplish this without any forethought on the part of the operator when recording starting or finishing time.

The use of time recorders for accurately recording time consumed in various phases of industry, and trade, has become universal today because of the necessity of controlling costs to meet the competition of other individuals in the same field of endeavor. Naturally, the ultimate aim in using a device of this kind is to obtain the elapsed time as accurately as possible, and therefore the chance for human error must be overcome by making the operation simple and foolproof.

Therefore, it is a primary object of my invention to record elapsed time automatically while at the same time showing starting and finishing time, this being possible on several operations running concurrently without any regard for sequence of starting or finishing times being necessary.

It is a further object of my invention to provide a time recorder which is simple to operate.

It is an additional object of my invention to provide such a recorder which is both compact and neat in appearance.

Other objects and purposes of my invention will be immediately seen by persons acquainted with time recorders upon reading the following specifications and accompanying drawings, in which.

Figures 1, 2, 3:
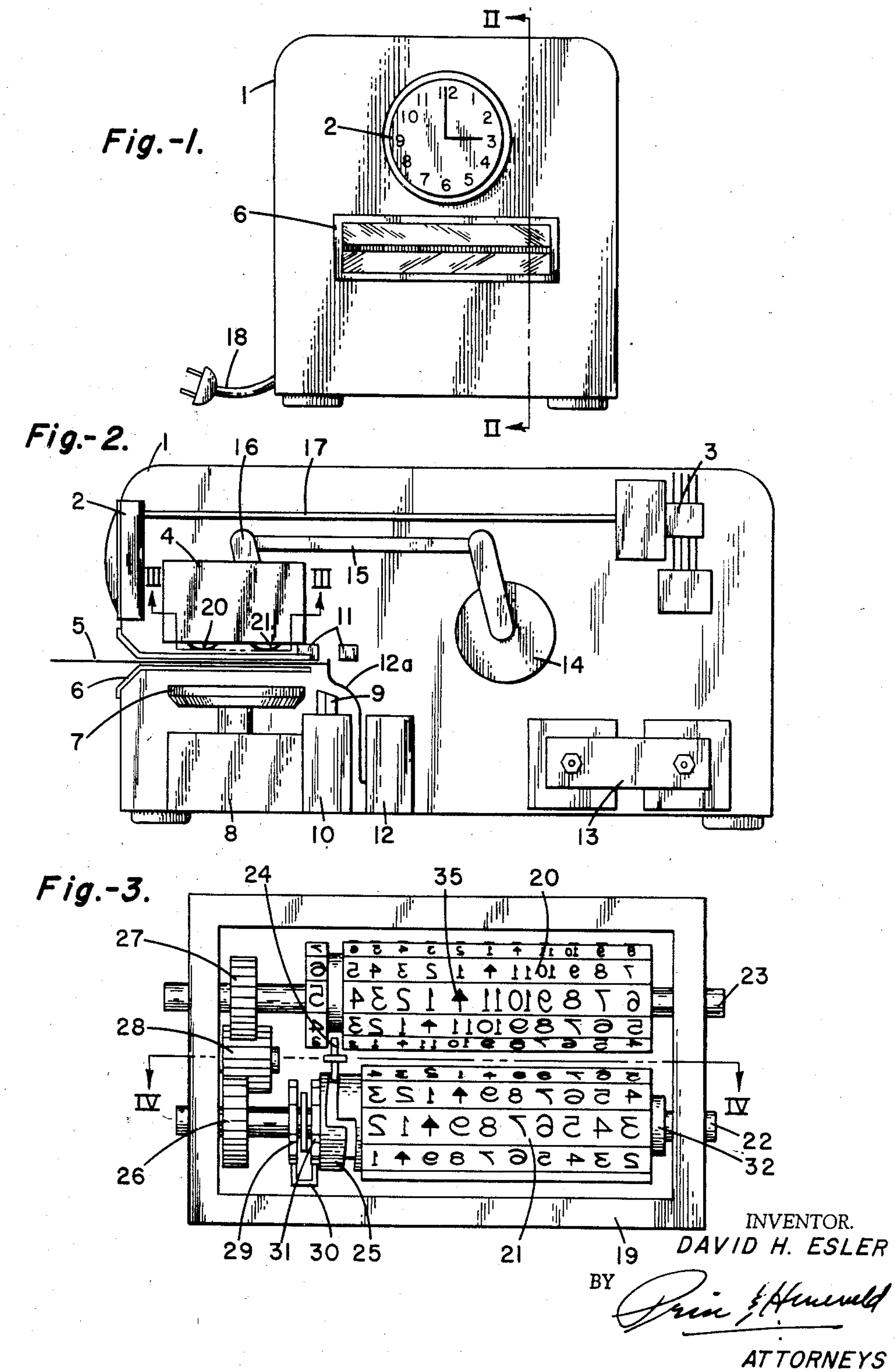
Figure 1 is front view of time recorder embodying my invention.
Figure 2 is a sectional elevation taken along plane II—II of Figure 1 not showing details of my invention.
Figure 3 is a sectional elevation taken along plane III—III of Figure 2, showing in more detail features of printing section of my invention.

In the following description it is assumed the standard available methods of power applications are employed to accomplish the desired movements of the various components; such as motors for rotary actions, solenoids for reciprocating action, etc.

Referring now to the drawings in greater detail the numeral 1 (Figs. 1 and 2) refers to a suitable cabinet in which is mounted a clock dial 2 which is driven by shaft 17 from a suitable available synchronous electric clock motor 3. A time printing mechanism 4 is mounted in such a position that a time card 5 may be inserted through a slot in bezel 6 and will be aligned automatically with said printing mechanism. A rubber platen 7 is mounted on solenoid 8. A cutter 9 is mounted on solenoid 10. A cutting die 11 is mounted on underside of type section. An electrical switch with actuating arm is shown 12 and 12*a*. A full wave rectifier is shown at 13 which supplies power to direct current solenoid 14 which actuates printing type wheels through link 15 attached to arm 16. A power cord 18 with standard plug for supplying electrical power from standard receptacle is furnished.

Figure 4:
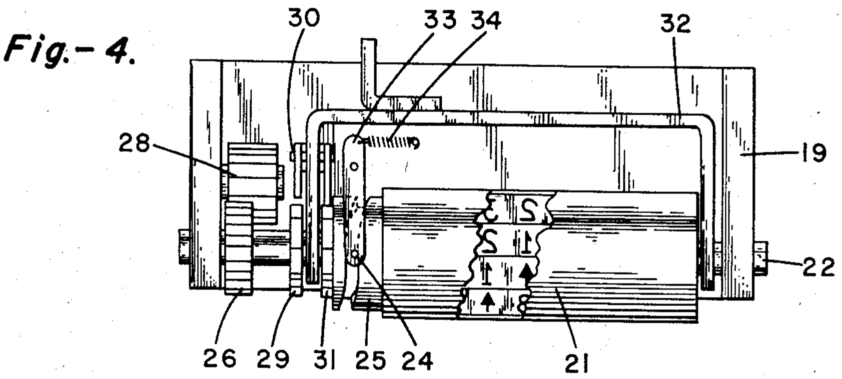
Figure 4 is a sectional elevation taken along plane IV—IV of Figure 3 showing additional details of printing section of my invention.

Referring to Figures 3 and 4 which show details of time printing mechanism numeral 19 refers to a substantial frame in which is mounted hour type cylinder 20 and tenths of hours type cylinder 21. Shaft 22 is pressed into ends of frame members and all components mounted on this shaft rotate about same. Cylinder 20 is affixed to shaft 23 and this shaft is able to rotate as well as move endwise in bearing holes in end members of frame. Hour cylinder 20 is positioned endwise by index pin 24 which is controlled by cam 25. This cam is an integral part of tenths cylinder 21. Gear 26 drives gear 27 affixed to shaft 23 through idler gear 28. The gear 26 is an integral part of ratchet wheel 29 which has 12 teeth, thus each tooth corresponds with each row of figures on hour cylinder. Pawl 30 actuates ratchet 31 with each reciprocating movement of yoke 32 through solenoid 14 transmitting its movement through link 15. Ratchet 31 has one deep cut tooth which allows pawl 30 to drop into ratchet 29 once every ten jumps since this ratchet 31 has ten teeth corresponding to the ten rows of figures on tenths cylinder.

Cam 25 is attached to cylinder 21 so that each segment of revolution causes index pin 24 to position hour cylinder in a new position lengthwise each tenth of an hour. At the end of each hour cam 25 allows spring 34 to return index pin through cross slot in cam to its starting position thus returning hour cylinder to its starting position as a new group of figures come into printing position through turning of gear train.

Each numeral 12 on hour cylinder is replaced with an arrow 35 as is each numeral 10 on tenths cylinder.

*Operation*

Type cylinders in recorder are kept in synchronization with clock dial by energy supplied each tenth of an hour to solenoid 14. The printing numerals are so arranged that the figure on the left in the hour line records the same hour as hour hand indicates and figure on left in tenths line records the same tenth as minute hand indicates.

Figure 5:
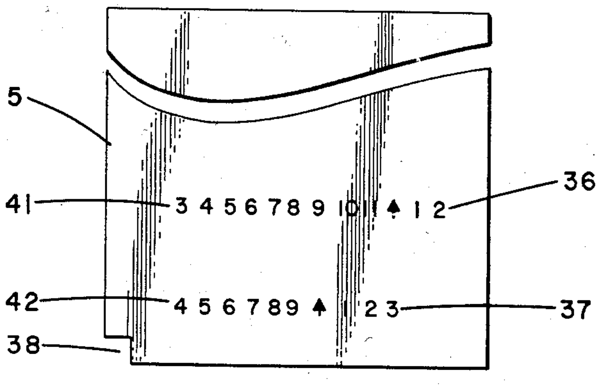
Figure 5 is a facsimile of results obtained from first insertion of time card into time recorder embodying my invention.
Figure 6:
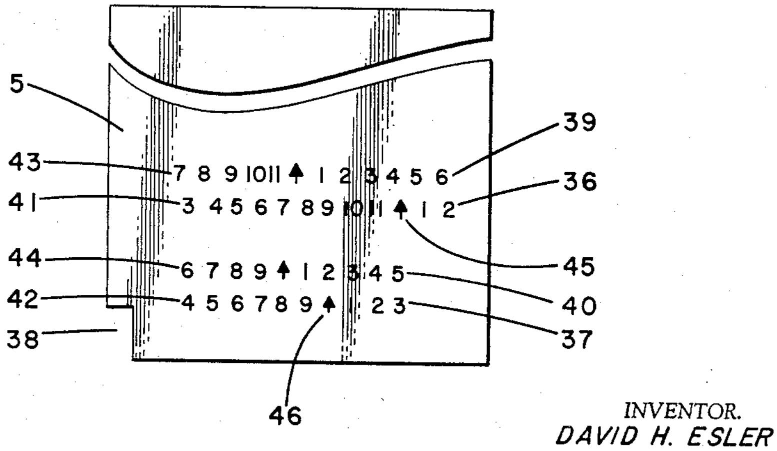
Figure 6 is a facsimile of results obtained from second insertion of time card in time recorder embodying my invention.

In use a time card 5 is inserted into slot 6 and pushed into machine until switch blade 12*a* is engaged. This completes circuit furnishing power to printing solenoid 8 and cutter solenoid 10. An ink ribbon between printing wheels and time card surface causes imprint of figures to be recorded on time card as platen 7 strikes card against type wheels. A facsimile of such an imprint is shown in Figure 5, lines 36 and 37. As this imprint is made cutter 9 is forced through die 11 thus cutting out corner of card as shown at 38.

The purpose of said notch is to automatically allow card to go into recorder a little deeper on second insertion, or on the "time out" registration, thus imprinting the second set of figures 39 and 40, slightly above the "time in" registration.

In reading the time shown on the card it will be noted that figure 41 is the "hour in" and figure 42 is the tenth "in," thus 3.4 was the time operation started. Figures 43 and 44 show the hour and tenth "out," thus 7.6 was the time operation ended. This is an elapsed time of 4.2 hours, and I find that reading the numerals directly above arrows 45 and 46 show this elapsed time of 4.2 without the necessity of computing same.

The hours cylinder is caused to move endwise slightly with each advance of the tenths cylinder so that any operation starting just before an hour change and ending just after an hour change will show less than one hour even though the hour cylinder has advanced a full hour. This being accomplished by the hours cylinder dropping back endwise a full row of figures at the point of hour change, i. e., if a recording is taken at the 59th minute of any hour, the "in" time would be that hour and 9 tenths. Then if an "out" recording is taken at 7 minutes past the hour the tenth arrow will point to the correct tenth and the hour arrow will not show one hour even though the hour cylinder has advanced because of the new position endwise causing the one hour figure to imprint to the right of the arrow in the previously recorded hour row. The same situation will exist in any multiple of the above example such as from 3.9 to 8.1, etc.

It will be understood that the shape and type of cabinet, the means of power, and arrangement of component parts may be modified. These modifications, and others of similar nature, may each be made without departing from the original scope and intent of my invention. It is understood that all such modifications will be included within the terms of the following claims excepting as said claims may, by their own terms, expressly provide otherwise.

I claim:

1. In a time recorder for recording elapsed time, a cabinet having a card entrance slot, a continuously operating clock having a time telling dial in a side of said cabinet, two printing rollers mounted for rotation about their longitudinal axes within said cabinet above said slot therein, one roller being an "hour" roller having twelve rows of type figures lengthwise thereof and with the rows in succession around the roller, generally equally spaced in the lengths of said rows, and each row including twelve characters comprising the figures 1 to 11 inclusive and a pointer between the figures 1 and 11, the other roller being a "tenths" roller having ten rows of type figures lengthwise thereof and with the rows in succession around said roller, generally equally spaced in the lengths of said rows, and each row including ten characters comprising the figures 1 to 9 inclusive and a pointer between the figures 1 and 9, the characters of any two adjacent rows of type characters on each roller being offset so that around the first roller, twelve spaced consecutive rows of type characters from 1 to 11 in succession and a pointer between the characters 1 and 11 are provided, and around the second roller ten spaced consecutive rows of type characters from 1 to 9 in succession and pointers between the characters 1 and 9 are provided, means for turning the second roller one-tenth of a revolution at each successive tenth of an hour, means for turning the first roller by the second roller one-twelfth of a revolution on each complete revolution of the second roller, the first type characters on said rollers corresponding to the hour and tenths of an hour indicated on said dial, means for progressively longitudinally moving the first roller a predetermined distance in one direction of its length during a revolution thereof and returning it to initial position on completion of each revolution, means for pressing a card entered in said slot against said type characters, and means actuated by said card on full entrance thereof into said slot for operating said pressing means, thereby printing two spaced rows of characters on said card, the first characters of which record the time in hours and tenths of an hour when said card is entered and printed in identity with the dial.

2. In a means for recording elapsed time, two horizontal rollers mounted side by side to turn about horizontal axes, one an "hour" roller and the other a "tenths" roller, means for turning said "tenths" roller through an arc of one-tenth of a circle every tenth of an hour, driving and controlling means between the rollers for moving the "hour" roller by the "tenths" roller through an arc of one-twelfth of a circle every hour, said rollers carrying ten rows of type characters on the "tenths" roller, and twelve rows of type characters on the "hour" roller, said rows being equally spaced around and extending lengthwise of the rollers, and the type characters at one of the ends of said rollers and under sides corresponding to the hour and tenth of an hour of the time of day, means for printing on a card adapted to be located below said rollers, type impressions corresponding to the type characters of the lowermost rows on said rollers at the time a card is placed below said rollers, whereby the first printed characters on said card of two pairs of rows of characters printed, one of each pair of one time and the other at a later time, provide a time card record of beginning and of ending a time of employment, and means in the rows of said pairs of rows pointing to and recording the elapsed time in hours and tenths of an hour between said printings on said card.

3. In a means for recording elapsed time, two rollers mounted side by side to turn about parallel axes, one an "hour" roller and the other a "tenths" roller, means for turning said "tenths" roller through an arc of one-tenth of a circle every tenth of an hour, driving and controlling means between the rollers for moving the "hour" roller by the "tenths" roller through an arc of one-twelfth of a circle every hour, means for supporting a card adjacent said rollers, said rollers carrying ten rows of type characters on the "tenths" roller, and twelve rows of type characters on the "hour" roller, said rows being equally spaced around and extending lengthwise of the rollers, and the type characters at one of the ends of said rollers and the side adjacent said card corresponding to the hour and tenth of an hour of the time of day, means for printing on the card type impressions corresponding to the type characters of the rows on said rollers adjacent said card at the time said card is placed adjacent said rollers, whereby the first printed characters on said card of two pairs of rows of characters printed, one of each pair at one time and the other at a later time, provide a time card record of the beginning and of the ending of a period of time, and means in the rows of said pairs of rows pointing to and recording the elapsed time in hours and tenths of an hour between said printings on said card.

4. In a means for recording elapsed time, two rollers mounted side by side to turn about parallel axes, one an "hour" roller and the other a "tenths" roller, means for turning said "tenths" roller through an arc of one-tenth of a circle every tenth of an hour, means for turning said "hour" roller an arc of one-twelfth of a circle every hour, said turning means for said "hour" and "tenths" rollers being coordinated, means for supporting a card adjacent said rollers, said rollers carrying ten rows of type characters on the "tenths" roller, and twelve rows of type characters on the "hour" roller, said rows being equally spaced around and extending lengthwise of the rollers, and the type characters at one of the ends of said rollers and the side adjacent said card corresponding to the hour and tenth of an hour of the time of day, means for printing on the card type impressions corresponding to the type characters of the rows on said rollers adjacent said card at the time said card is placed adjacent said rollers, whereby the first printed characters on said card of two pairs of rows of characters printed, one of each pair at one time and the other at a later time, provide a time card record of the beginning and of the ending of a period of time, and means in the rows of said pairs of rows pointing to and recording the elapsed time in hours and tenths of an hour between said printings on said card.

5. In a time recorder adapted to print on a surface an initial time, a final time and a computation of the elapsed time between said initial and final times expressed in hours and portions thereof, the combination comprising: a pair of parallel elongated rollers mounted in side by side spaced relationship, one for recording hours and the second for recording portions of an hour; said hour roller having twelve columns of figures, said columns being arranged lengthwise of said roller; each of said columns having eleven figures and a pointer; said pointer in each column being offset one figure from each adjacent column; said second roller having as many columns of figures as divisions of an hour are expressed on said roller, said columns being arranged in parallel rows lengthwise of said roller; each of said columns having as many figures as columns less one plus a pointer; said pointers on said second roller being offset in each column one figure from the pointers in each adjacent column; means for intermittently rotating said second roller the distance between two adjacent columns, said means being synchronized to rotate said second roller as many times per hour as there are columns thereon; means for intermittently rotating said hour roller the distance between two adjacent columns once per hour; means to index the impression receiving surface beneath said rollers when said final time is to be marked thereon so that said rollers print an impression parallel to and coordinated with the impression of the initial time printed thereon; means for bringing said card and rollers together for forming a printed impression on said surface.

References Cited in the file of this patent

UNITED STATES PATENTS

| | | |
|---|---|---|
| 1,483,820 | Lundgren | Feb. 12, 1924 |
| 1,706,047 | Tisdale | Mar. 19, 1929 |
| 2,447,803 | Hobby | Aug. 24, 1948 |
| 2,454,711 | Odell | Nov. 23, 1948 |
| 2,496,686 | Williams | Feb. 7, 1950 |